J. DICK.
CONVEYER.
APPLICATION FILED OCT. 9, 1912.

1,065,596.

Patented June 24, 1913.
2 SHEETS—SHEET 1.

Witnesses

Inventor
Joseph Dick
By Harry Frease
Attorney

J. DICK.
CONVEYER.
APPLICATION FILED OCT. 9, 1912.
1,065,596.
Patented June 24, 1913.
2 SHEETS—SHEET 2.
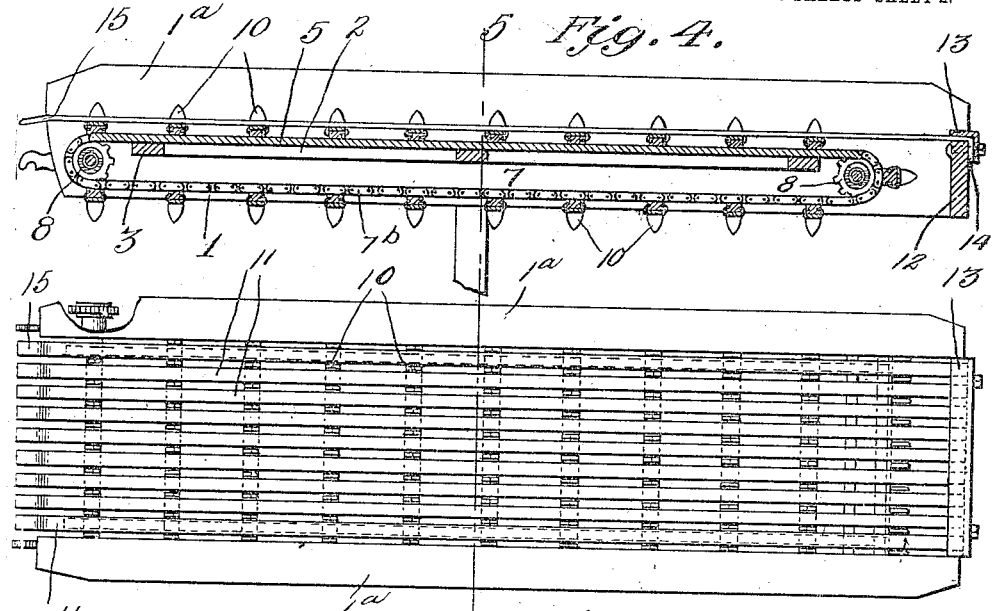
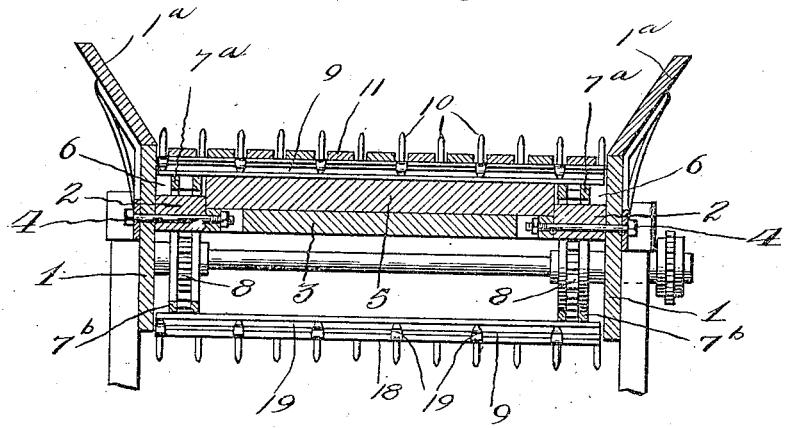
Witnesses
Philip A. H. Verrell
Elfriede Schmidt.
Inventor
Joseph Dick
By Harry Frease
Attorney

UNITED STATES PATENT OFFICE.

JOSEPH DICK, OF CANTON, OHIO.

CONVEYER.

1,065,596.

Specification of Letters Patent.

Patented June 24, 1913.

Original application filed August 3, 1912, Serial No. 713,085. Divided and this application filed October 9, 1912. Serial No. 724,693.

*To all whom it may concern:*

Be it known that I, JOSEPH DICK, a citizen of the United States, residing at Canton, county of Stark, and State of Ohio, have invented certain new and useful Improvements in Conveyers, the same being illustrated and described, but not claimed, in my application for Letters Patent for improvements in fodder-cutters, filed August 3, 1912, Serial No. 713,085, and of which invention the following is a specification.

The invention relates to endless conveyers, as for the feed trough and feed hopper in fodder cutting machines; and the object of the invention is to provide a simplified and self cleaning construction of such conveyers.

A preferred embodiment of the invention, thus set forth in general terms, as applied to the feed trough and feed cutter of a fodder cutting machine, is illustrated in the accompanying drawings forming part hereof, in which—

Figure 1:
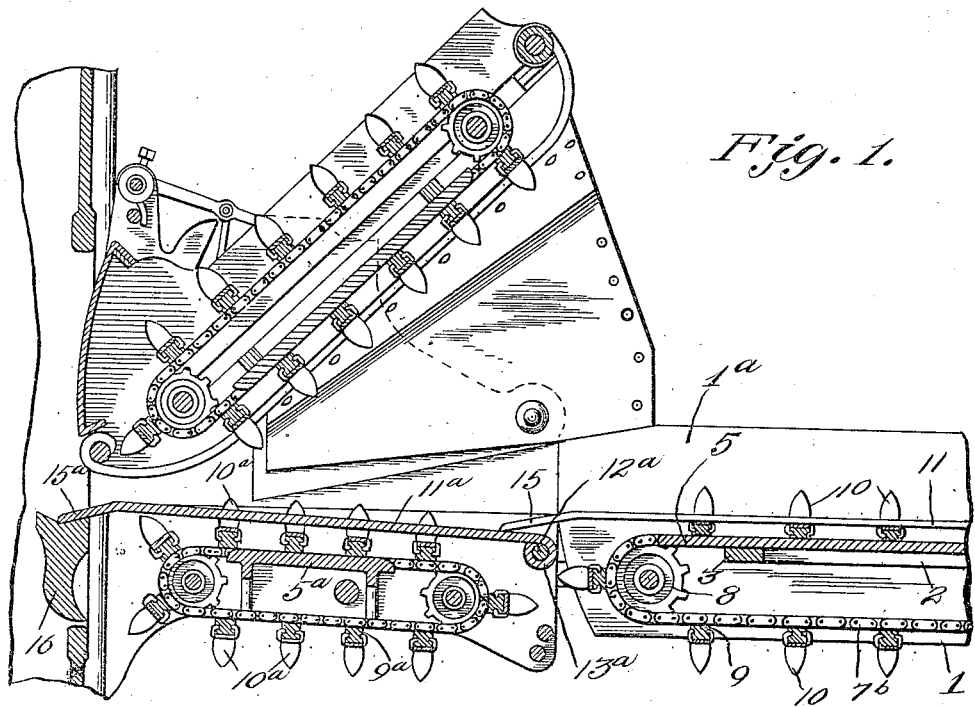
Figure 2:
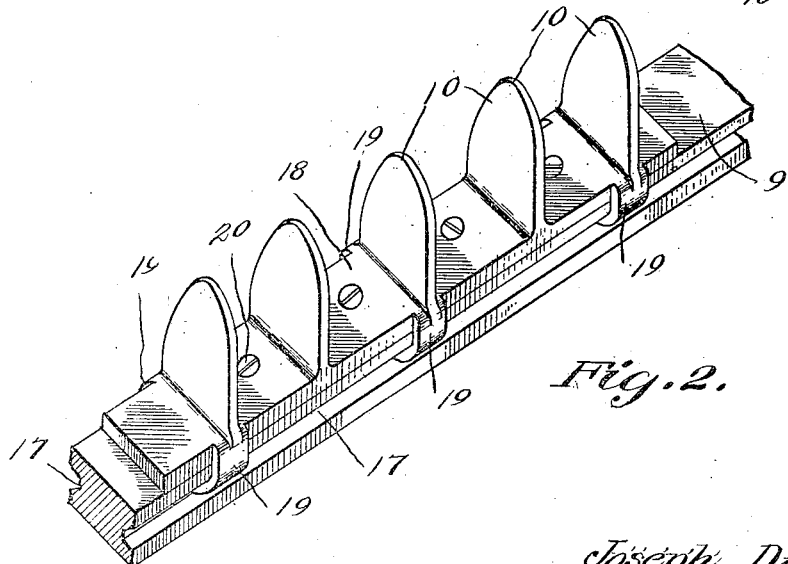

Figure 1, is a longitudinal section of the feed hopper and part of the feed trough of a fodder cutting machine, showing the application of the improved form of conveyer thereto; Fig. 2, a fragmentary perspective view of one cross strip showing the teeth thereon; Fig. 3, a plan view of the feed trough, Fig. 4, a longitudinal section thereof, and Fig. 5, a cross section thereof on line 5—5, Figs. 3 and 4.

Similar numerals refer to similar parts throughout the drawings.

The feed trough includes the side walls 1, the upper portions 1ª of which are flared outward in the usual manner; the side sills 2, which are clamped between the side walls and the ends of the cross sills 3 by means of the bolts 4; and the bearing board 5, located on the cross sills between the side sills of the trough. The upper surface of the bearing board is located above the upper surface of the side sills, thus providing the channels or grooves 6 in each side of the trough.

The endless conveyer in the bottom of the feed trough is composed of the gear chains 7, operating around the gear wheels 8, to which chains are secured the cross strips 9, each of which carries a row of teeth 10; the space between the gearing chains being slightly in excess of the width of the bearing board 5 so that the upper strands 7ª of the gear chains are adapted to operate freely above the side sill in the channels 6 in each side of the feed trough, while the corresponding cross strips 9 rest and travel upon the upper surface of the bearing board; it being understood that the lower strands 7ᵇ of the gearing chains hang freely suspended between the ends of the conveyer.

The face of the conveyer is composed of the series of longitudinal bars 11, laid loosely between the teeth 10 upon the intervening portions of the cross strips 9; the forward ends of the bars being secured to the forward end board 12 of the feed trough as by the angle bar 13 secured to the end board and engaged over the depending tongues 14 of the face bar; while the rear ends 15 of the face bars rest loosely upon the bottom of the feed-hopper conveyer, which is preferably composed of a similar series of longitudinal face bars 11ª, the forward ends 13ª being secured on the cross rod 12ª and the rear ends 15ª resting freely upon the cutter bar 16 of the fodder cutting machine.

The feed-hopper conveyer is preferably made like the feed-trough conveyer, with the cross strips 9ª sliding upon the bearing plate 5ª and provided with the teeth 10ª, which teeth operate between the face bars 11ª, which in this conveyer are preferably bridged between the cross rod 12ª and the cutter bar 16 to relieve the cross bars of some of the pressure of the fodder in the hopper.

By this peculiar construction and arrangement, it is evident that the ends of the teeth which protrude above the face bars, serve to comb and carry the fodder forward along the same, and it is furthermore evident that any portion of the fodder which may drop down or become tangled around the face bars is carried freely along the same and slips off the forward end thereof without catching or clogging at any point. The forward ends 15 or 15ª of the face bars being free to rise whenever necessary to permit the passage of material underneath the same.

The cross strips 9 and 9ª are preferably made with the longitudinal grooves 17 in the forward and rear edges thereof, and a plurality of teeth 10 are preferably formed integrally on the plate sections 18 which are provided with the tongues 19 adapted to be clamped in the grooves and the screws 20 may also be provided for securing the plates to the strips. This construction permits the plate sections to be made long enough to carry a plurality of teeth; and yet short enough to avoid irregular shrinkage in casting, and also to permit a substitution of a comparatively small number of teeth in case of breakage.

I claim:

1. A fodder-cutter feed-conveyer including a frame with chain gearings mounted therein, cross strips on the gear chains having series of spaced teeth thereon, a bearing board in the frame between the upper strands of the chains for the cross strips, and longitudinal face bars forming the bottom of the conveyer secured to the frame at the forward end and extending thence freely between and beyond the teeth of the several strips, and below the points of the teeth.

2. A fodder-cutter feed-conveyer including a frame with chain gearings mounted therein, cross strips on the gear chains having series of spaced teeth thereon, and longitudinal face bars forming the bottom of the conveyer secured to the frame at the forward end and extending thence freely between and beyond the teeth of the several strips, and below the points of the teeth.

3. A fodder-cutter feed-conveyer including a frame, cross strips with series of teeth thereon traveling in the frame, and longitudinal face bars forming the bottom of the conveyer secured to the frame at the forward end and extending thence freely between and beyond the teeth of the several strips, and below the points of the teeth.

4. A cross strip for a fodder-cutter feed-conveyer having grooves in its edges, and a plate having a plurality of teeth thereon with tongues on its sides clamped in the grooves for securing the plate on the strip.

JOSEPH DICK.

Witnesses:
FERD J. ZETTLER,
D. W. CHAPMAN.